J. S. PRICE.
MOTOR VEHICLE.
APPLICATION FILED SEPT. 29, 1913.
1,247,004.
Patented Nov. 20, 1917.
3 SHEETS—SHEET 3.
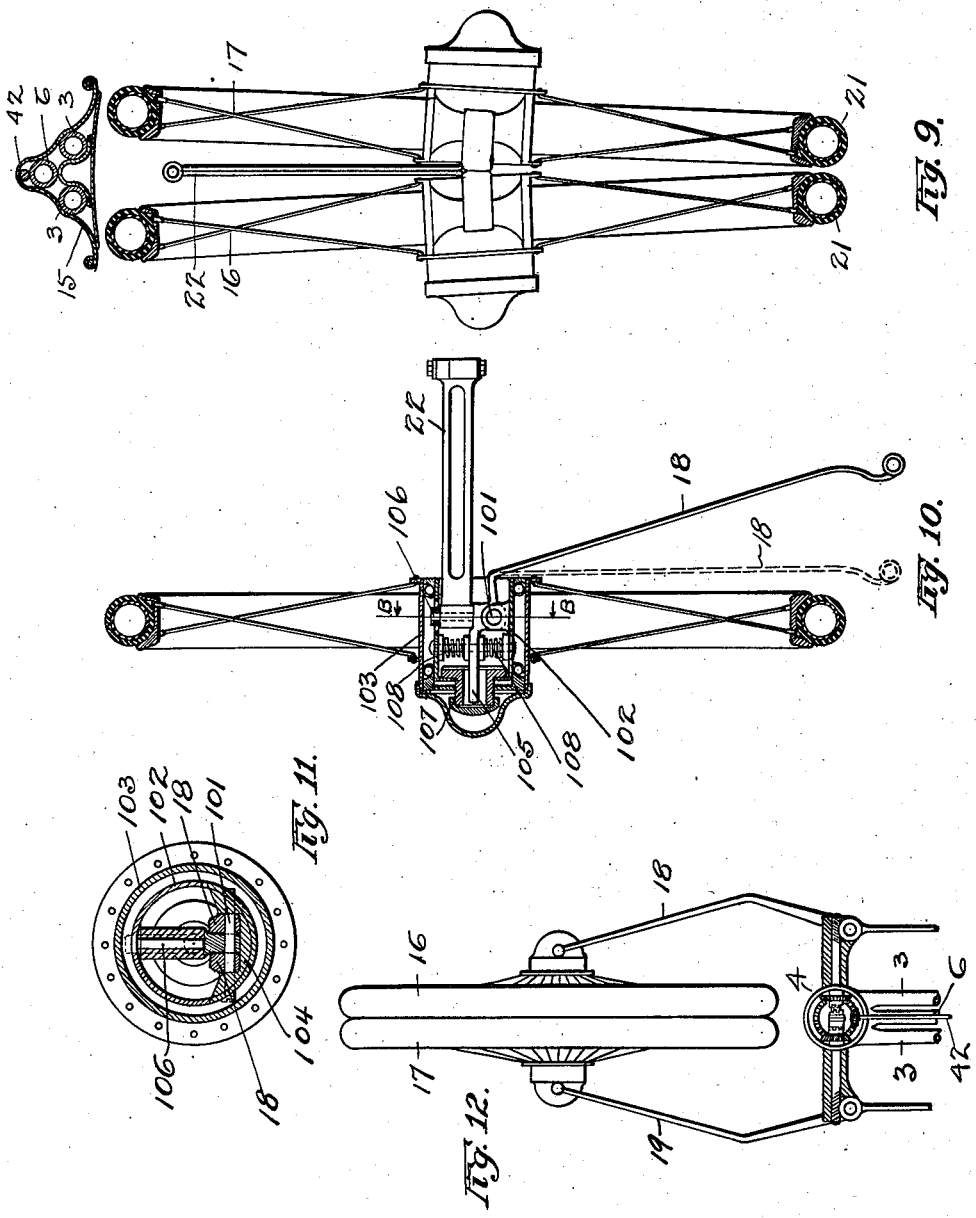
WITNESSES:
INVENTOR
JULIUS S. PRICE
BY
Miller & White
his ATTORNEYS

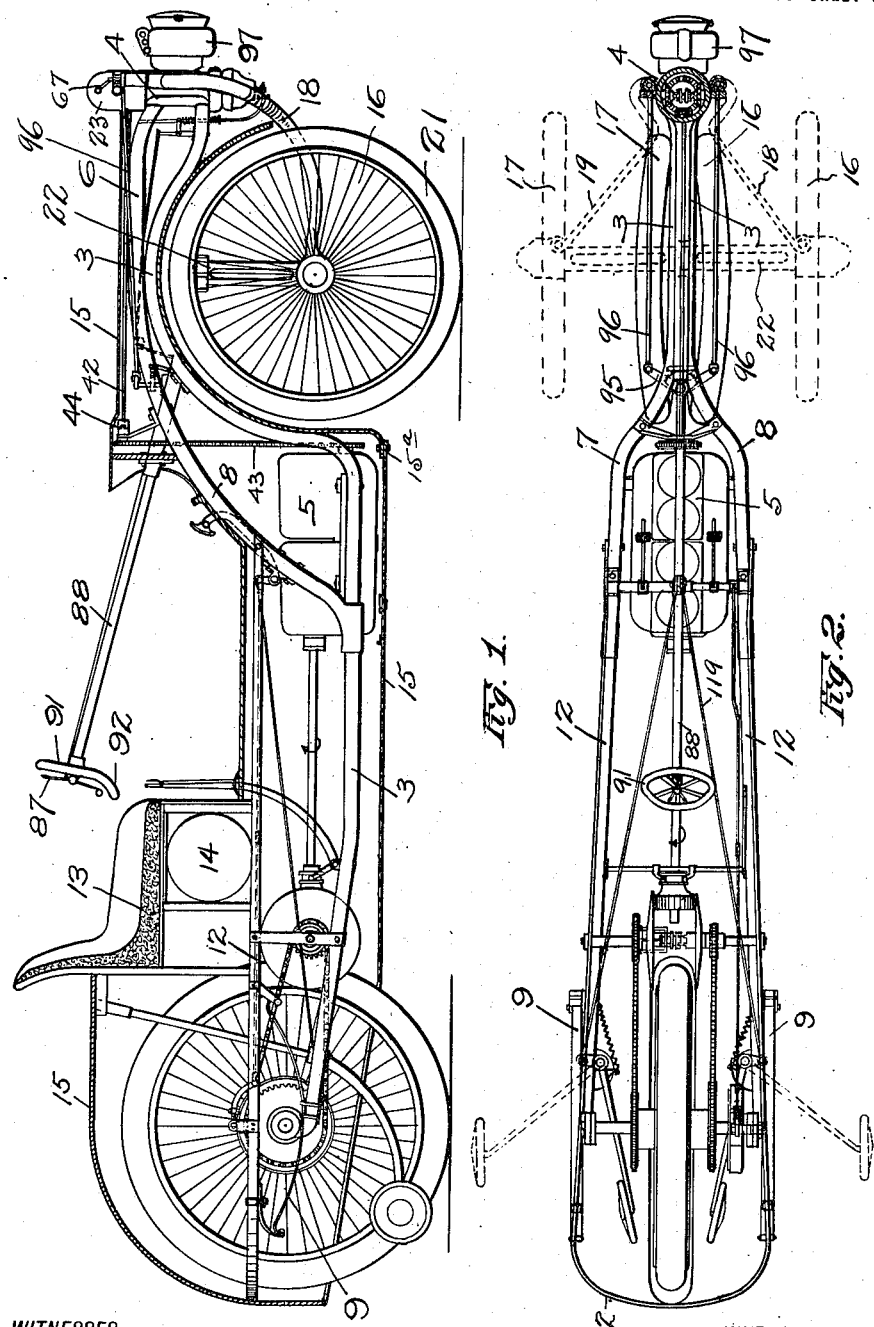

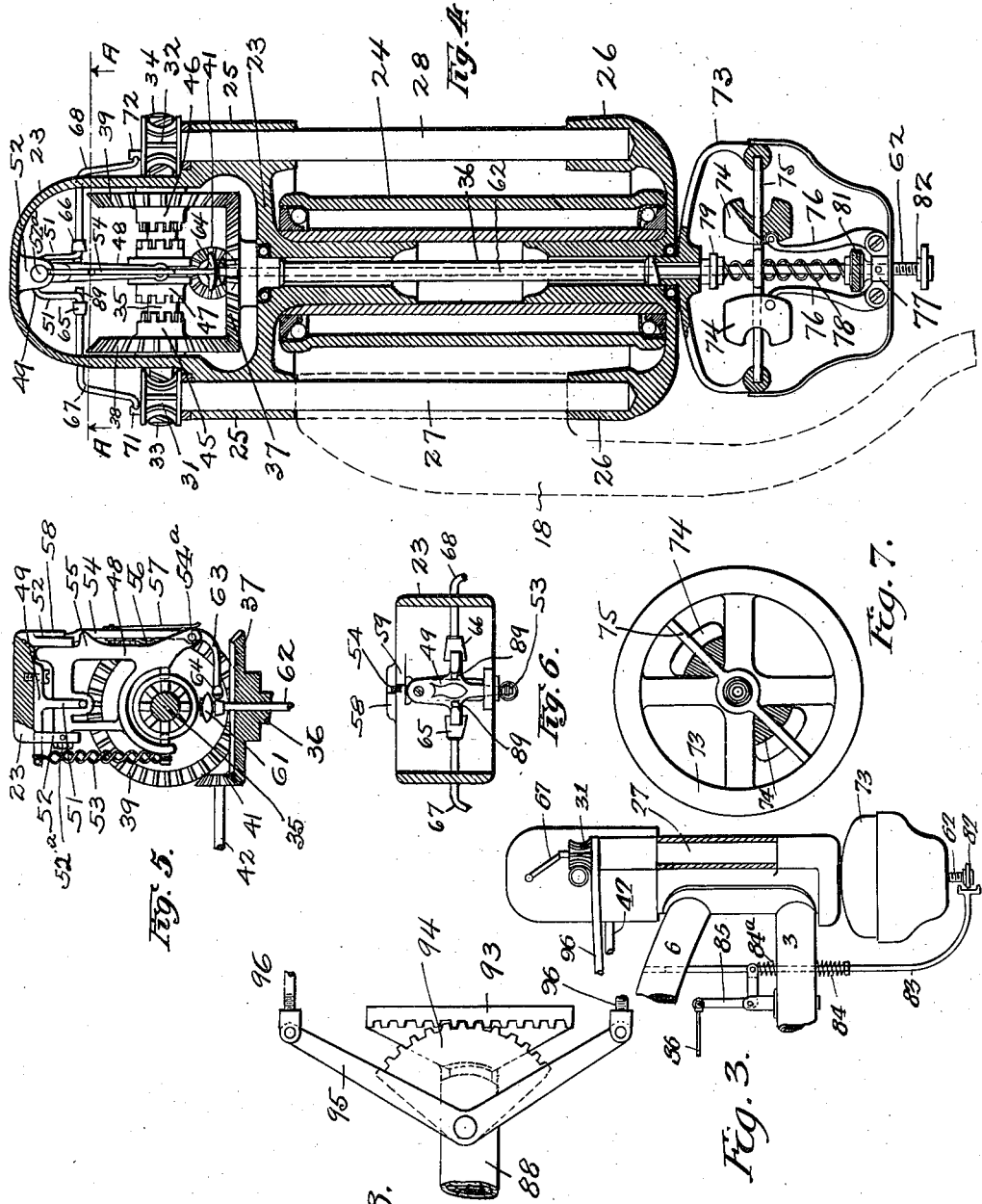

UNITED STATES PATENT OFFICE.

JULIUS S. PRICE, OF SAN FRANCISCO, CALIFORNIA.

MOTOR-VEHICLE.

1,247,004. Specification of Letters Patent. Patented Nov. 20, 1917.

Application filed September 29, 1913. Serial No. 792,344.

*To all whom it may concern:*

Be it known that I, JULIUS S. PRICE, a citizen of the United States, and a resident of the city and county of San Francisco, State of California, have invented certain new and useful Improvements in Motor-Vehicles, of which the following is a specification.

The invention relates to motor vehicles, such as motorcycles, which normally contact with the ground at substantially two places only, and which depend upon motion for their equilibrium.

The object of the invention is to provide a vehicle of the class described having inherent stability.

Another object of the invention is to provide a vehicle having wheels which are laterally movable in opposite directions during the movement of the vehicle, to convert a vehicle having substantially only two road bearing surfaces into a vehicle having three or more road bearing surfaces spaced from each other.

Another object of the invention is to provide means governed by the speed of the vehicle for moving said wheels laterally.

Another object of the invention is to provide a motorcycle which obviates all of the inconveniences and limitations of the motorcycles now on the market.

The invention possesses many other objects and advantageous features, which, with the foregoing, will be set forth at length in the following description where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description, as I may adopt many variations within the scope of my invention as expressed in said claims.

The standard motorcycle of the present day has many inconveniences and limitations, due partly to the fact that the vehicle has stability only when moving and for this reason must be made light and narrow. It is essential that the vehicle be of such weight that it may be handled, balanced and lifted by one person, and it must be narrow in order that the rider's feet may contact with the ground on either side to support the machine when starting or stopping, running slow or when standing still. This necessitates that the rider straddle the machine, causing him to assume an awkward and uncomfortable position. Further than this, since such vehicles depend entirely upon speed for equilibrium, it is impossible to operate them at slow speeds, and the high rates of speed at which they are operated render them very objectionable to other persons.

Since the vehicle will not balance when stopped or moving slowly, it is essential that it be made of sufficient lightness to be readily handled by one person, thereby prohibiting their use for delivery and package transportation purposes, a use to which otherwise they are particularly adapted. The field of the usefulness of the vehicle, however, is being constantly increased, notwithstanding the limitations inherent in the vehicle itself, on account of the demand for a light, economical, handy and efficient machine, which meets road conditions much better than a three or four wheeled machine.

The vehicle of my invention is designed to overcome all of the disadvantages of the motor cycle now on the market, while retaining its advantageous features, thereby providing a vehicle having economy, speed and flexibility, comfort and the carrying capacity of a three or four wheeled motor vehicle. I have provided a vehicle which when running slow or standing has at least a three point contact with the ground, and when moving at a speed sufficient to maintain equilibrium, is essentially a two wheeled vehicle. In the present embodiment I accomplish this result by providing a twin wheel which is separable laterally into two wheel parts or wheels. These wheel parts or wheels are alined substantially axially and are movable laterally away from or toward each other. When separated each wheel part constitutes a wheel by itself and when the parts are taken together they form substantially one wheel and operate as one wheel. It is essential that the spread of the parts of the twin wheel may be varied outwardly to produce sufficiently laterally separated road contacts to insure stability when the vehicle is stationary and that the wheel parts may be moved inwardly to such close relation that they form a twin wheel and the advantages of a two wheeled vehicle thus obtained. Wherever herein I refer to a two wheeled vehicle it is to be understood that I refer to a vehicle which is capable of traveling narrow paths and which partly relies on motion for stability. I have also provided means governed by the speed of the motor for moving the wheels laterally, so that the operator may be relieved of that duty, but it is understood that this may be accomplished manually or in any other manner. The mechanism shown in the present embodiment is constructed so that when a speed sufficient to secure stability is reached, the wheel parts of the twin wheel are moved inward to form in effect a single wheel and when a speed insufficient to secure stability is reached, the twin wheel separates laterally into its two component wheels. In the spreading apart or contracting of the twin wheel the wheel parts are turned slightly from the direction of travel so that they run in or run out instead of being forced to the desired positions, thereby relieving the operator and the actuating mechanism of any effort and saving wear on the tires and strain on the machine. Means are also provided for alining the wheel parts after they have reached their proper positions.

Referring to said drawings:

Figure 1 is a side elevation of one form of the vehicle of my invention, the body being shown in section to disclose the various parts.

Fig. 2 is a plan view of the chassis of the vehicle shown in Fig. 1, the dotted portions indicating the extended position of the twin wheel and side braces.

Fig. 3 is an elevation of the head of the vehicle.

Fig. 4 is a transverse sectional elevation of the head of the vehicle showing the means for producing transverse movement of the twin wheel parts.

Fig. 5 is a vertical section of the upper part of the head taken at right angles to that of Fig. 4.

Fig. 6 is a cross section taken on the line A—A Fig. 4, looking in the direction indicated.

Fig. 7 is a bottom view of the governor shown in Fig. 4.

Fig. 8 is a detail of the steering mechanism.

Fig. 9 is a vertical section taken through the twin wheel of the vehicle.

Fig. 10 is a horizontal section through one of the twin wheel parts, showing the hub construction; the front portion of the figure being the leading portion of the wheel.

Fig. 11 is a cross section of the hub taken on line B—B Fig. 10.

Fig. 12 is a modified form of twin wheel mounting.

On account of the many differences between the vehicle of my invention and motorcycles now on the market, and in order to obtain the desired comfort for the rider, the appearance of the vehicle differs considerably from the appearance of present motorcycles. It is evident that the features of my invention can be combined with different designs of frames and bodies to produce vehicles of different appearances for different uses and it is not my intention to confine myself to the structure disclosed in the accompanying drawings. These drawings merely show one form of the machine, which is necessary for the purposes of this application.

Any suitable frame which meets the requirements of the invention and practical conditions may be used. The frame in the embodiment shown is formed of the tubing now in general use, which possesses both lightness and strength. The present frame consists of two sections of tubing 3 which curve over the forward wheel and are securely fastened or brazed to the outer shell of the head 4 at their forward ends. These tubes extend backward in close proximity to each other from the head 4 to a position adjacent the rear of the front wheel where they diverge from each other a sufficient distance to accommodate the motor 5, from whence they extend backward at a slightly diverging angle to the rear where they support the rear wheel axle. Arranged over and midway between the tubes 3 over the front wheel is a section of tubing 6 which is secured to the upper part of the outer shell of the head 4. This tubing section extends backwardly to a point above the rear of the front wheel, where it forks into two parts 7—8 which curve downward and outward and join the side tubings 3 adjacent the rear end of the motor. This arrangement of tubing produces a substantial and thoroughly braced frame which lends itself very well to this type of vehicle. By sloping the tube members downwardly a low hung frame is produced which lowers the center of gravity of the machine and enables the driver to readily step into and out of the vehicle. Supported on this frame by suitable springs 9 is the body rail 12 upon which is arranged the driver's seat 13, the gasolene storage tank 14 and the desired body. The body may be of any suitable design but preferably consists of a sheet metal housing 15 inclosing the frame, the motor and the driving gear. The body rails 12 are hinged or pivoted to the frame at their forward end to permit a movement of the body with respect to the frame, which movement is controlled by the interposed springs 9. The front part of the body housing is secured to the frame and the rear part to the body rails, and the relative movement of the two parts of the housing is accommodated by means of the slip joint 15$^a$.

The vehicle of my invention is essentially a two-wheeled vehicle, one wheel being placed in front and one in the rear and one of the important features of my invention is the provision of a twin wheel as a front or steering wheel. This twin wheel is composed of a pair of wheels or wheel parts 16—17 which are bodily movable laterally so that their spread may be varied, operating to produce a vehicle having the properties of a two wheeled vehicle or a three wheeled vehicle. These relatively laterally movable wheel parts, which when separated from two wheels, may be arranged at the front of the vehicle, as shown, or at the rear of the vehicle, or both ends of the vehicle may be provided with transversely movable wheels, although I prefer to arrange them at the front only, for the reason of simplicity and ease of operation. The twin wheel parts may be moved laterally for a sufficient distance outward to produce a stable vehicle when stationary and may be moved inward so that the wheel parts lie close together and form in effect a single wheel. The wheel parts 16—17 are mounted upon the curved arms or forks 18—19, which may either curve backward or forward from the head 4, and may be attached to the wheel hubs either on the inside or the outside. In Figs. 1 and 2 the arms are shown sloping backward and attached to the inner side of the hub, and in Fig. 12 they are shown extending forward and downward and attached to the outer side of the hub. The arms 18—19 are curved downward so that they clear the frame of the machine when the twin wheel is turned at an angle to the longitudinal axis of the frame when turning corners, and are made of sufficient strength to carry the load and withstand the strains of traffic. When the arms are attached to the inner side of the hub, the front wheel parts are preferably inclined slightly to each other, so that the tires 21 may contact at the point where they engage the ground and at the same time provide space between the wheel parts at or adjacent their axes for the arms. When the arms are arranged on the outside of the hubs, as shown in Fig. 12, the wheel parts may be disposed in vertical planes and may be moved laterally into contact forming one wheel. Attached to each hub, in a manner which will be hereinafter described, are the leaves of a hinge 22, which folds upward as the wheel parts move to form a twin wheel. The hinge not only operates to limit the outward movement of the wheel parts and strengthen and stiffen the construction when the wheel parts are spread, but primarily operates to assist in maintaining the wheel parts in alinement.

The arms 18—19 are pivoted in a revolving part of the head 4 and are curved downward and inward immediately back of the head, so that when the wheel parts lie close together forming a twin wheel, the arms may lie between them. When the arms are moved outward the twin wheel is separated into two parts and when the arms are moved inward the wheel parts are combined into one wheel in effect. It is evident that the arms may be operated manually by the driver of the vehicle, but I prefer to incorporate for this purpose a mechanism driven by the motor. This motor driven mechanism may be controlled manually by the driver or may be automatically controlled by variations in speed of the engine. The mechanism for moving the twin wheel parts inward and outward is located in the head 4.

Arranged in the head 4 is the partially rotatable element 23 which is supported by suitable bearings upon the shell or stationary part 24 of the head, which stationary part is secured to the frame of the vehicle. The rotatable element is provided adjacent its upper and lower ends with arms or projections 25—26 in which the shafts 27—28 bear. These shafts 27—28 may be formed integrally with the arms 18—19 or may be formed separately and the arms keyed thereto, which construction I believe to be preferable. The shafts are rotatable in the projections 25—26 so that the arms may be moved inwardly or outwardly to produce the desired relative position of the twin wheel parts.

Secured to the upper ends of the shafts 27—28 are worm gears 31—32, threaded in opposite directions, which are engaged by worms 33—34 on the opposite ends of shaft 35. It is evident, therefore, that if shaft 35 be rotated in one direction, the twin wheel of the vehicle will be separated, and if the shaft moves in the opposite direction, the separated wheel parts will be brought together again. Power to operate the shaft 35 is obtained from the motor 5, so that the speed of the shaft is proportionate to the speed of the motor. Arranged within the head upon the rotatable vertical shaft 36 is a bevel gear 37 which is in mesh with the two bevel gears 38—39 loosely mounted on shaft 35, causing them to revolve in opposite directions. Meshing with gear 37 is a bevel gear 41 fixed on the shaft 42 which extends backward from the head 4 to a position above the engine 5, with which it is connected by suitable means, such as gears and the chain 43. Interposed in shaft 42 adjacent its rear end is a small manually operated clutch 44 which may be opened when it is desirable to cut off communication between the engine and the mechanism in the head. Should the mechanism in the head become out of order or if for any other reason it is desirable to stop its operation, the clutch 44 may be opened.

The gears 38—39 are provided on their adjacent sides with toothed clutch plates 45—46 and splined to shaft 35 between these gears is a clutch member 47 provided with teeth on its opposite faces, adapted to engage the teeth on clutch plates 45—46. A movement of the clutch member into engagement with one clutch plate causes a rotation of shaft 35 in one direction, and a movement of the clutch member into engagement with the other clutch causes it to revolve in the opopsite direction. The clutch member 47 is provided with an annular groove in which projections on the rocking arm 48 seat, causing a movement of the rocking arm to shift the clutch member. The movement of the rocking arm for engaging the clutch plates is produced by means of the centerpiece 49 which is provided with arms 51 lying on opposite sides of the rocking arm and adapted to engage the arm below its pivotal axis. The centerpiece is pivoted at one end to the upper part of the rotatable element 23, the other end of the centerpiece extending through a slot in the element 23 and projecting therefrom. The rocking arm 48 is pivoted to ears 52 arranged at the upper extremity of element 23 by means of a bolt 52ª. Attached to the projecting end of centerpiece 49 and to the lower part of the rocking arm 48 is a helical spring 53 which operates to cause the rocking arm to move in the desired direction, as will hereinafter be described.

The rocking arm is normally held in the central position, with the clutch member 47 out of engagement with the clutch plates 45—46 by means of the key 54 which is pivoted at 54ª to an ear on the lower end of the rocking arm, and which is reinforced against side pressure by lying between the ears 55 at the upper portion of the arm, thereby causing the key to move with the arm. The key is normally held in the central position to lock the rocking arm in place by means of the flat springs 56—57 engaging the opposite sides thereof. The upper end of the key seats in a peculiar slot Fig. 6 formed in one of the ears 52 so that when it is released, the rocking arm can only move in the proper direction. That is, if the twin wheel is separated and the key is operated, the rocking arm can only move in the direction which accomplishes the bringing together of the twin wheel parts. The key being pivoted to and guided by the rocking arm, it is evident that the rocking arm is constrained to move in that direction only in which the key is free to move.

The slot in the ear 52 is formed by the two oppositely placed staggered protuberances 58—59, the ends of which are spaced apart a sufficient distance to allow the passage of the end of the key therebetween. This construction is best shown in Fig. 6. Normally, the end of the key 54 lies midway between the two staggered ends of the protuberances 58—59 so that it may not move transversely in either direction. When the key is moved opposite protuberance 58 and out of line with protuberance 59 it may move to the right (Fig. 6) allowing a movement of the clutch member in one direction and when the key is moved opposite protuberance 59 and out of line with protuberance 58, it may move to the left (Fig. 6) allowing a movement of the clutch member in the opposite direction on the shaft 35.

The key is rocked on its pivot to produce the desired operations by means of the button 61 arranged on the upper end of the vertical shaft 62. The key is provided with a substantially horizontal portion 63 lying below the pivotal point having on its end a transverse head 64 which is engaged by the button 61 in its vertical movement. The upward movement of the button raises the head end of the key and causes the upper end of the key, to move out of contact with protuberance 59 so that it may move to the right (Fig. 6) and the downward movement of the button from above the head on the key pushes the head end of the key lever downward, moving the upper end of the key out of alinement with protuberance 58, allowing a movement of the key toward the left. In order that the button may not move past the head 64 when the rocking arm or key is in an inclined position, which position it assumes when the clutch member is being shifted, the head is lengthened transversely and the transverse portions are provided with ears which lie in the path of the button when the rocking arm is inclined and the upper end of the key is alined with either protuberance. Should the button therefore, attempt to pass the head, when the rocking arm is in an inclined position, its movement will be arrested until the arm moves to the central position, when the pressure of the button will move the end of the key through the slot, so that the button may pass. This is necessary in order that the button may not pass the head without actuating the key so that the successive movements of the clutch member be such that when the twin wheel is separated, the next operation will be to close it and vice versa. In other words, the clutch member must move from contact with clutch plate 45 to clutch plate 46 before it can again engage clutch plate 45. The key, therefore, controls the direction of movement of the clutch member and the means for producing such movement will now be described.

Engaging the arms 51 of the centerpiece are thimbles 65—66 which are attached to push rods 67—68 bearing in the rotatable member 23 and extending into close relation with the tops of the worm gears 31—32 secured to the arm moving shafts 27—28.

Arranged on the tops of the worm wheels are buttons 71—72 which are adapted to contact with and push the push rods 67—68 as the worm wheels turn. When the twin wheel parts approach their extreme outward position, one button, for instance button 71, contacts with push rod 67, moving it to the right (Fig. 4), and when the wheel parts approach their extreme inward position, the other button 72 contacts with push rod 68 moving it to the left (Fig. 4). The movement of the push rods in either direction produces a movement of the centerpiece 49 in the same direction. Attached to the free end of the centerpiece is the spring 53 which is attached to the rocking arm 48 adjacent to its lower oscillating end. A movement of the centerpiece about its pivot causes the spring 53 to assume an inclined position and the horizontal component of the force of the spring moves the rocking arm in the direction of the pull and slides the clutch member along the shaft 35. Arranged on the inner side of the arms 51 of the centerpiece 49 are nubs 89 which contact with the rocking arm below its pivot and operate to positively move the clutch member out of contact with the clutch face at the proper time. When the rocking arm reaches the vertical position, the key 54 drops into the notch between protuberances 58 and 59 and holds the clutch member in a neutral position. Before the clutch member became disengaged from the clutch face with which it was engaged, the centerpiece had approached the limit of its throw, so that although the rocking arm is locked in the central position, the spring 53 is inclined and exerts a pull on the rocking arm toward the opposite clutch face, so that when the key is again actuated by the movement of the button 61 it is moved into alinement with the proper protuberance 58 or 59, and the clutch member is thereby slid into engagement with the other clutch face, due to the inclined pull of the spring on the rocking arm. In this manner the clutch member is alternately shifted to the opposite clutch faces so that the successive movements of the wheel carrying arms 18—19 are in opposite directions, causing alternate spreading and contracting of the twin wheel parts, and the times of lateral movement of the wheels is controlled by the vertical movements of the button carrying shaft 62.

The vertical movement of the shaft 62 may be controlled at will by the driver of the vehicle or may be controlled automatically by the speed of the engine and in the present embodiment I have illustrated a construction employing both methods, which I believe to be preferable. The automatic mechanism comprises a fly wheel 73 secured to the lower end of shaft 36 in which is arranged a centrifugal governor which operates by variations in speed to raise and lower the shaft or rod 62. The governor comprises the governor weights 74 mounted on the cross bar 75, so that they are capable of lateral motion only, and so that their position is not affected by the jolting of the vehicle. Pivoted to the weights 74 are the links 76 which are pivoted at their lower ends to the cross head 77, which is screwed to the push rod 62. As the weights move outwardly due to an increase in the speed of the governor, the cross head and rod 62 are raised and when the speed again decreases the cross head is lowered. The lifting force of the outwardly moving weights is opposed by the spring 78 surrounding the push rod, and the compression of the spring may be varied so that the push rod is moved at different speeds of travel. The compression of the spring is controlled by the nut 79 screwed to a flange on the fly wheel and by the nut 81 screwed to the push rod. The upward and downward stroke of the push rod 62 and its consequent action on the release key 54 is regulated by screwing the push rod in or out of the cross head 77.

The lower end of the push rod 62 is provided with a button 82 having a collar thereon, which is adapted to be engaged by the forked end of the rod 83 for the purpose of causing a movement of the push rod independently of the governor mechanism. The forks on the end of rod 83 are spaced apart a sufficient distance, so that when the rod 83 is in the neutral position, the movement of the rod 62 by the governor is not interfered with. The rod 83 is normally held in the neutral position by means of the springs 84—84ᵃ. The rod 83 is connected through suitable mechanism such as the bell crank lever 85 and the rod 86 and other suitable connecting mechanism, with a control lever 87 preferably arranged at the head of the steering column 88. This allows the driver to control the relative positions of the twin wheel parts independently of the speed of the vehicle. Since the governor mechanism is controlled by the speed of the engine which is not always in the same ratio to the speed of the vehicle, it is evident that some means are essential for allowing the operator to control the position of the front wheel parts.

Steering the vehicle is accomplished by means of the hand wheel 91, which is preferably eccentrically mounted on the steering rod arranged in the steering post 88. The center of rotation of the wheel 91 is arranged toward the upper part of the wheel thereby giving the driver more purchase on the wheel without making it of large diameter. The lower portion 92 of the wheel is preferably sloped toward the driver's seat to produce a more comfortable hand rest and bring the operative portion of the wheel nearer the driver. The throttle and spark control levers are also arranged at the head of the steering post. Secured to the lower end of the steering rod is a sector 93 which meshes with a sector 94 mounted on a vertical shaft which bears in a fixed part of the machine. Secured to this shaft is the bent lever 95 to the opposite ends of which are attached the rods 96 which extend forward and are pivoted to ears on the rotatable member 23 in the head. This allows the course of the vehicle to be changed whether the twin wheel is in its separated or combined postion. Attached to the rotatable part 23 of the head is a lamp 97, which on account of its position of attachment to the revolving head always directs its rays in a line with the twin wheel, regardless of its position, thereby lighting the path onto which the vehicle is moving.

I have stated hereinbefore that the construction of the hubs and bearings of the laterally movable twin wheel parts is such that the wheel parts are not forced outward and inward, but are slightly turned so that they run outward or inward until they reach either extreme position. This action is obtained by the method of attachment of the arm bearing within the hub. Referring to Figs. 10 and 11, it will be noted that the vertical pivot or pin 101 in the hub to which the arm 18 is attached is located in line with the center of pressure of the tire on the ground so that the pull of the arm forward will be in a straight line therewith, instead of on the side of the wheel as is the case with the front wheels of automobiles. This position of the pivot 101 makes the wheel self-alining with the line of travel and since the pivot 101 is arranged slightly forward of the axis of rotation of the wheel, a movement of the arm inward or outward causes the wheel to turn in that direction. The amount of the free lateral movement of the wheel to either side of straight alinement is controlled so that it may not be excessive. Secured to the inner cydinder 102 of the hub which forms the axle or support of the wheel and between which and the outer cylinder or hub proper 103 the wheel bearings are arranged, is a forging or casting 104 in which the pivot pin 101 seats. Mounted on the pivot pin, preferably between the bifurcated ends of the arm 18 is a lever having an axially extending pin 105 and a laterally or backwardly extending pin 106. The end of the pin 106 upon which pin the hinge leaf 22 is journaled is disposed in a slot in the axle 102 and the pin 105 extends into a hollow nut 107 fixed in the outer end of the inner cylinder. The lever comprising the pins 105 and 106 is movable with respect to the hub a limited distance, the amount of play being determined by the inner diameter of the hollow nut 107 and the free lateral movement being partially restricted and eased by compression springs 108 arranged between the inner cylinder and the pin 105. Because of the special method of mounting the twin wheel hub to the arms, the wheel parts normally maintain alinement with the direction of travel and the plane of the wheel is, therefore, normally held at right angles to the pin 105, but may be moved to an angle with the pin by the movement of the arm 18. The hinge which is journaled to the pin 106 operates to hold the pins 106 in both wheel parts parallel and alined with their normal direction of travel, and holds the pins 105 in the two wheel parts alined, but allows the wheel parts to turn inward in closing and outward when opening, but only to a controlled extent, and under the restraint of the springs.

The twin wheel is separated into two wheel parts by the screw actuated arms turning the parts outwardly. The pressure of the arms is applied at the pivot point which is forward of the true axis of rotation of the wheel and in advance of its contact with the ground, thus giving the wheel parts a slight caster effect with reference to the arm mountings. Thus the arms actually push the fronts of the wheel parts outwardly when spreading them and in closing them they pull the fronts inwardly. The wheel parts, from their caster-like mounting, are self alining with the direction of travel, but under the slight pressure of the arms at the pivot, the fronts of the wheel parts are turned inwardly or outwardly according to the direction the arms may be moving, so that the wheel parts actually run inward or outward according to the position of their front portions. It is apparent therefore that the wheel parts are not forced bodily outwardly or inwardly. The play of the wheel parts in this inward or outward movement, to or from each other, is regulated by the lever within the hub which is provided with pins 105 and 106 and which in turn is held in position by hinge piece 22. The lateral pin 105 of this lever extends into the hollow nut 107, so as to allow of a regulatable amount of play between the pin and the hollow nut. The hinge serves to keep in alinement the pins 105 and 106 and to brace the arms and wheel parts when separated. This hub, therefore, possesses the advantage of having the bearing or pivot of the turning arm within the hub itself, in front of the axis of the wheel part and in the line of pressure, causing the wheel part to be self-alining. These features make the hub equally advantageous for automobile use. One of the weaknesses of the automobile front wheel bearing is that the wheel is held in alinement with the direction of travel by the steering arm and knuckle, which soon wear and cause lost motion. It is to be understood, therefore, that I do not desire to limit myself to the employment of this hub in the particular type of vehicle shown herein, since it is apparent that it may be used to equal advantage on other vehicles.

I claim:

1. In a vehicle, a twin wheel comprising two wheel parts, said wheel parts being adapted to be separated while in operation.

2. In a vehicle, a twin wheel comprising two wheels adapted to be adjusted to each other laterally of their planes while in contact with the ground.

3. In a motor vehicle, a twin wheel adapted to be separated into two axially alined wheels while in operative contact with the ground.

4. In a motor vehicle, a twin wheel comprising two wheels closely adjacent at their ground contacting portions and adapted to be separated while in operation.

5. In a motor vehicle, a twin wheel comprising two closely adjacent axially alined wheels adapted to be separated while in operative contact with the ground.

6. In a motor vehicle, a twin wheel comprising two axially alined wheel parts, said wheel parts movable toward and away from each other while in operation.

7. In a motor vehicle, a twin wheel comprising two separable wheels and means for moving said wheels away from and toward each other while in operation.

8. In a motor vehicle, two main supporting wheels at one end, one on either side of the vehicle and means for moving said wheels together while running to form substantially one wheel.

9. In a motor vehicle, a twin wheel comprising two closely adjacent wheels supporting one end of the vehicle and means for moving said wheels apart while in operation to form two main supporting wheels at that end.

10. In a motor vehicle, a twin wheel comprising two separable wheel parts, arms upon which said wheel parts are mounted and means for moving said arms to separate or close said wheel parts.

11. In a motor vehicle, a frame, arms pivotally attached to said frame, a twin wheel comprising two separable wheel parts on the outer ends of said arms and means for moving said arms to vary the distance between said wheel parts.

12. A two-wheeled vehicle having one of its wheels composed of separable wheel parts and means for separating said wheel parts to produce a three-wheeled vehicle.

13. In a motor vehicle, a twin wheel comprising two separable wheel parts and adapted to be turned about a vertical axis to steer said vehicle.

14. In a motor vehicle, a twin wheel comprising a pair of separable wheel parts, said wheel parts adapted to be turned about a vertical axis to steer said vehicle.

15. In a vehicle, a twin wheel comprising a pair of separable wheels and means for turning said wheels divergently or convergently relative to the line of motion of said vehicle.

16. In a vehicle, a twin wheel comprising a pair of separable wheel parts, and means for turning said parts in divergent directions and separating said parts and for turning said parts in converging direction and closing said parts.

17. In a vehicle, a twin wheel comprising a pair of separable wheels, means for turning said wheels in divergent direction and separating said wheels and for turning said wheels in convergent direction and closing said wheels and means for maintaining said wheels in substantial parallelism in their separated and closed positions.

18. In a vehicle, a frame, a rotatable head arranged on said frame, means for rotating said head, arms pivotally attached to said head, means for moving said arms in opposite directions and a twin wheel comprising two separable wheels mounted on said arms.

19. In a motor vehicle, a frame, a rotatable head arranged on said frame, arms pivotally attached to said head, means for simultaneously moving said arms in opposite directions laterally of the vehicle, a twin wheel comprising a pair of separable wheels pivotally attached to the outer ends of said arms, means for holding said wheels in substantial parallelism in their closed or separated position and means for partially rotating said head.

20. In a motor vehicle, a frame, a rotatable head arranged on said frame at the forward end, means for rotating said head, downwardly curved arms pivoted to said head, means for simultaneously moving said arms in opposite directions laterally of the vehicle, a twin wheel comprising a pair of separable wheels pivotally attached to the outer ends of said arms, and a hinge interposed between the bearings of said separable wheels.

21. In a motor vehicle, a twin wheel comprising two separable wheel parts and motor driven means for moving said wheel parts away from and toward each other.

22. In a motor vehicle, a twin wheel comprising a pair of separable wheels, and means controllable by the speed of the motor for controlling the relative positions of said wheels.

23. In a motor vehicle, a twin wheel comprising a pair of separable wheels, motor driven means for separating and combining said wheels, and means controllable by the speed of the motor for effecting the separated or the combined position of the wheels.

24. In a motor vehicle, a twin wheel comprising a pair of separable wheels, motor driven means for separating and combining said wheels, means controllable by the speed variation of the motor for determining the relative positions of the separable wheels and means independent of the motor speed for determining the relative positions of said wheels.

25. In a motor vehicle, a twin wheel comprising a pair of separable wheels, motor driven means for separating and combining said wheels, automatic means operable by variation in motor speed for controlling the degree of separation of said separable wheels and means independently operable for controlling said degree of separation.

26. In a motor vehicle, a frame, a pair of arms pivotally attached to said frame, a twin wheel comprising a pair of separable wheels mounted on the outer ends of said arms, motor driven mechanism adapted to move said arms laterally, and means automatically operable by variations in motor speed for controlling the application of power to said mechanism.

27. In a motor vehicle, a twin wheel comprising a pair of separable wheels adapted to be simultaneously moved in opposite directions laterally, and means operable independently or operable automatically by varying motor speeds for controlling the spread of said separable wheels.

28. In a vehicle, a twin wheel comprising a pair of separable wheels, an axle in each of said wheels and a laterally movable arm pivotally attached to each of said axles in front of the center of rotation of the wheel.

29. In a vehicle, a twin wheel comprising a pair of separable wheels, an axle for each of said wheels and a laterally movable arm pivotally attached to each of said axles at a point forward of the center of rotation of said wheel and lying in the plane determined by the largest circumference of said wheel.

30. In a vehicle, a twin wheel comprising a pair of separable wheels, an axle in each of said wheels, a laterally movable arm pivotally attached to each axle and means for permitting a limited movement of the axle about said pivot.

31. In a vehicle, a pair of arms movable laterally in opposite directions, a twin wheel composed of two separable wheels, axles for said wheels pivotally attached to said arms forward of the center of rotation of the wheels, an axially disposed pin arranged at the center of rotation of each wheel, means for holding said pins normally alined and means for permitting a slight inclination of the axles with respect to said pins.

32. In a vehicle, a wheel, a hollow axle arranged in said wheel on which is mounted an arm pivotally attached to said axle in front of the center of rotation of the wheel.

33. In a vehicle, a wheel, a hollow axle arranged in said wheel on which it rotates, and an arm pivotally attached to said axle at a point in advance of the center of rotation of the wheel and lying in the plane of the largest circumference of the wheel.

34. In a vehicle, a wheel, a hollow axle arranged in said wheel on which it rotates, means connecting said axle to the vehicle adapted to hold it in proper alinement and means permitting a slight movement of the axle with regard to said holding means.

35. In a motor vehicle, a pair of steering wheels, and means for turning said wheels, comprising arms pivotally attached to the wheel axles, by vertical pivots arranged in the central vertical planes of the wheels lying at right angles to the axes of the wheels and in advance of the center of rotation of the wheels.

36. In a motor vehicle, a pair of laterally movable arms, wheel supports pivotally attached to said arms, wheels mounted on said supports, a hinge connecting the said supports and springs disposed between said hinge and said supports.

37. In a motor vehicle, a pair of arms movable laterally in opposite directions, wheel supports pivotally attached to said arms by vertical pivots arranged in front of the center of rotation of the wheels, wheels bearing on said supports, levers pivotally attached to said supports by said vertical pivots, said levers having axially and rearwardly extending arms, a hinge pivotally attached to said rearwardly extending arms, and springs interposed between said axially extending arms and said supports.

38. In a motor vehicle, a pair of arms movable laterally in opposite directions, wheel supports for the wheels of said vehicle pivotally attached to the ends of said arms by vertically disposed pivots arranged in front of the center of rotation of said wheels, wheels bearing on said supports, levers pivotally attached to said supports by said vertical pivots, each of said levers having a rearwardly and an axially extending arm, said levers being capable of limited movement with respect to said supports, a hinge connecting the rearwardly extending arms of both levers adapted to maintain them parallel, and springs interposed between said axially extending arms and said wheel supports.

39. In a motor vehicle, a frame, a rotatable head arranged on said frame, a pair of guiding wheels, arms pivotally attached to said wheels and said head, means for moving said arms with relation to each other, a steering mechanism and rods connecting said steering mechanism with opposite sides of said rotatable head.

40. In a motor vehicle, a frame, a rotatable head arranged on said frame, arms pivotally attached to said head at opposite sides, means for moving said arms with relation to each other, wheel supports pivotally attached to said arms, wheels mounted on said supports, said points of attachment between the arms and supports being located in the central vertical planes of the wheels in advance of the center of rotation, said planes lying at right angles to the axes of the wheels, a steering mechanism, and rods connecting said steering mechanism with opposite sides of the rotating head.

41. In a motor vehicle, a frame, a rotatable head arranged on said frame, means for turning said head, arms pivotally attached to said head, wheels mounted on said arms, a worm wheel on each arm pivot, a shaft journaled in said head, worms on the shaft engaging said worm wheels adapted to rotate the same in opposite directions to vary the spread of the wheels, and motor operated means for driving said shaft in opposite directions.

42. In a motor vehicle, a frame, a rotatable head arranged on said frame, means for rotating said head, arms pivotally attached to said head, wheels mounted on said arms, a worm wheel on each arm pivot, a shaft journaled in said head, worms on the shaft engaging said worm wheels adapted to rotate the same in opposite directions, oppositely disposed gears having clutch faces loosely mounted on said shaft, a motor driven gear engaging said gears, a clutch member splined to said shaft, and means for shifting said clutch member into engagement with either clutch face.

43. In a motor vehicle, a frame, a rotatable head arranged on said frame, means for rotating said head, arms rotatably journaled in said head, wheels mounted on the ends of said arms, motor driven means for moving said arms in opposite directions transversely to vary the spread of said wheels, means for locking said power driven means in inoperative position, and means for controlling said locking means.

44. In a motor vehicle, a pair of wheels movable laterally in opposite directions, arms on which said wheels are mounted, motor driven means for moving said arms laterally, a shiftable clutch member arranged in said power driven means adapted to connect said driven means to said arms, a rocking arm serving to shift said clutch member, means for locking said clutch member in inoperative position, means for releasing said locking means, and means for moving said clutch member into operative position to move said arms.

45. In a motor vehicle, a pair of wheels movable laterally in opposite directions, arms on which said wheels are mounted, motor driven means for moving said arms laterally, and means operative by the movement of said arms laterally for disengaging said motor driven means from said arms.

46. In a motor vehicle, a pair of wheels, laterally movable arms on which said wheels are mounted, means including a pair of clutch members for moving said arms laterally and means operative by the approach of the arms to their extreme positions for disengaging said clutch members.

47. In a motor vehicle, a pair of wheels movable laterally in opposite directions simultaneously to vary the spread of the wheels, arms on which said wheels are mounted, motor driven means for moving said wheels laterally, including a slidable clutch member adapted to make and break connection between said motor driven means and said arms, means for moving said clutch member to make and break such connection comprising a sliding centerpiece, a rocker arm engaging said clutch member, a spring connecting said rocker arm and centerpiece, means for locking said rocker arm in its central position, means operative by the approach of the wheels to their extreme positions for moving said centerpiece, and means for releasing said rocker arm so that the clutch member is moved in the proper direction to insure the proper lateral movement of the wheels.

48. In a motor vehicle, a pair of wheels movable laterally in opposite directions simultaneously, motor driven means for moving said wheels laterally, and means operative by variations in speed of the motor for controlling said motor driven means, said controlling means comprising a fly ball governor having its weights mounted on a horizontal arm, the movement of the weights operating to vary the vertical position of a governing rod, the governing rod and means on said rod for controlling said motor driven means.

In testimony whereof, I have hereunto set my hand at San Francisco, California, this 23rd day of September 1913.

JULIUS S. PRICE.

In presence of—
H. G. Prost,
P. S. Pidwell.